April 14, 1959

J. L. SOLOMON 2,882,453

SEQUENCING SYSTEM FOR WELDING MACHINES

Filed Feb. 18, 1953

INVENTOR.
Julius L. Solomon,
BY

April 14, 1959

J. L. SOLOMON 2,882,453

SEQUENCING SYSTEM FOR WELDING MACHINES

Filed Feb. 18, 1953

INVENTOR.
Julius L. Solomon,
BY

United States Patent Office 2,882,453
Patented Apr. 14, 1959

2,882,453

SEQUENCING SYSTEM FOR WELDING MACHINES

Julius L. Solomon, Chicago, Ill., assignor to Welding Research, Inc., Chicago, Ill., a corporation of Illinois Application February 18, 1953, Serial No. 337,571

6 Claims. (Cl. 315—252)

The invention relates to welding systems for resistance welding of metals and has reference in particular to an improved electronic circuit for controlling the several steps of a complete welding operation and for additionally timing the duration of each individual step.

In most welding machines the welding operation is initiated by the operator who is required to close a foot switch provided for the purpose. The closing of the foot switch effects movement of the electrodes, causing them to close upon the work-pieces to be welded and the welding current is thereupon caused to flow through the work to effect the weld. In the resistance welding of metals it is necessary to apply a predetermined pressure for squeezing the work-pieces together before current flow takes place. Also the duration of the current flow must be timed for the particular metals being welded and following the welding it is desirable to hold the work-pieces in contact until proper annealing of the weld has taken place.

The invention provides a basic system which may be used in performing switching operations in sequence by fully electronic means. In other words, the system will operate automatically to switch from the squeeze period to the weld "on" time period and then to the hold time and finally to the weld "off" time. The fully electronic system of the invention additionally incorporates timing means for timing each individual step and which may be separately adjusted so that each step in the complete welding operation may be timed individually of the remaining steps.

Another object of the invention is to provide an improved control circuit for welding which will consist of commutating circuits with timing means associated with each circuit for delaying the commutation from one circuit to the next, thus providing sequencing means having utility for timing the several individual steps of the welding operation.

A more specific object resides in the provision of an electronic sequencing circuit for timing the various steps of a welding operation, for example, and for controlling the switching from one step to the next, and wherein the sequencing circuit has electrically associated therewith an improved electronic counter which will time the welding operation in multiples of a certain interval of predetermined duration.

A further object is to provide an improved electric counting device such as may be employed for timing the flow of welding current and which is adjustable by reason of a manually actuated pre-set switch for timing periods of varying duration within the range of the device.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 5 is a view showing the character of square wave as produced by the timing and reversing circuit; and Figure 6 is a view showing the peaked wave shapes as developed from each impulse of the square wave of Figure 5.

Figure 1:
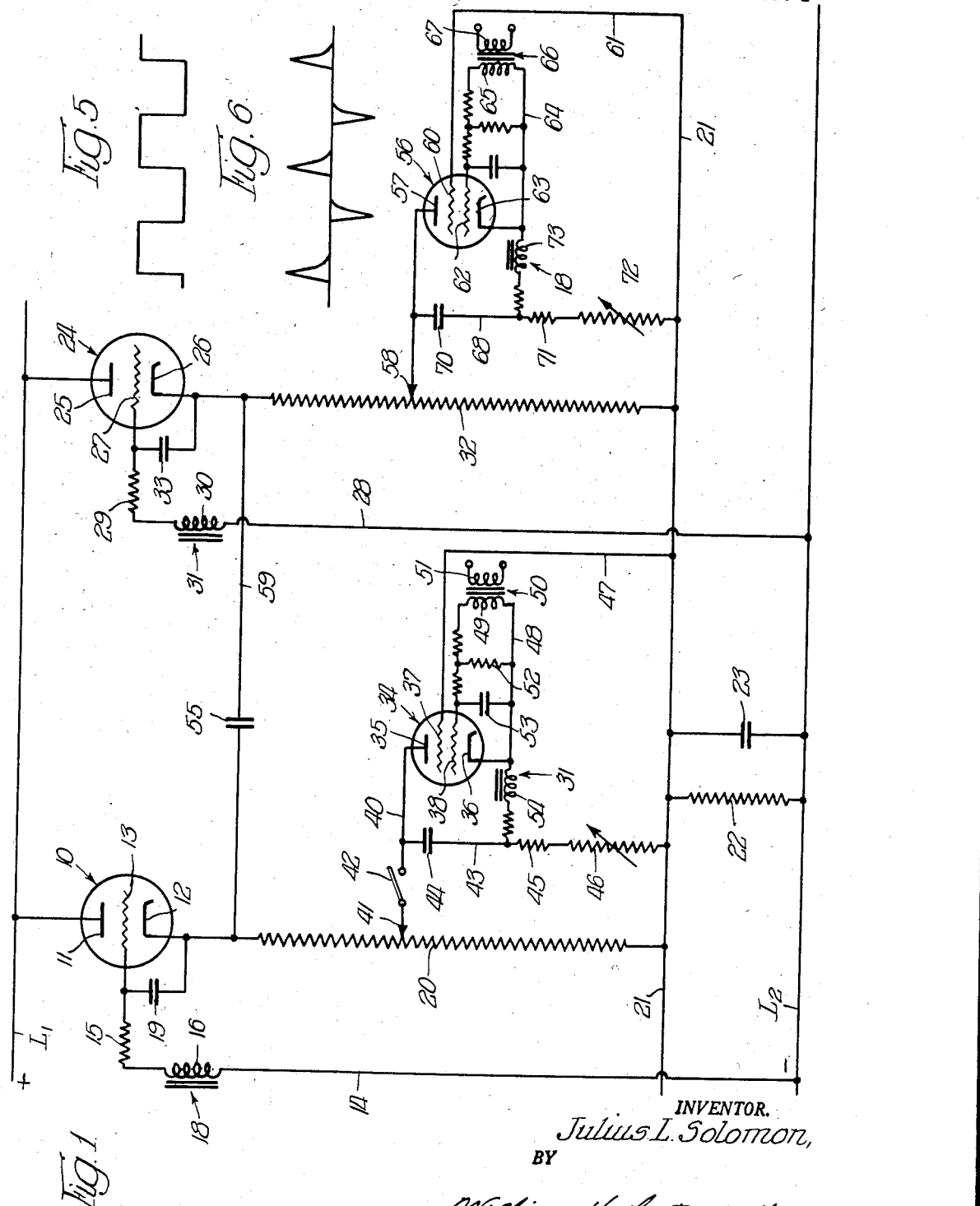
Figure 1 is a wiring diagram schematically showing basic commutating circuits coming within the invention and also illustrating timing means in association with each circuit and a method of switching from one commutating circuit to the next.

Figure 1 of the drawings discloses a pair of basic commutating circuits electrically connected to form a system which may be used in timing certain operations and in switching from one operation to the next in sequence. The system is fully electronic and each commutating circuit is substantially similar in construction and in mode of operation. The electric power for the circuits is direct current which is supplied to L1 and L2 comprising the positive and negative terminals, respectively. The tube 10 which is gas filled and grid controlled, includes the anode 11, the cathode 12 and grid 13. Anode 11 is connected to terminal L1, the positive terminal of the direct current source. The grid 13 is connected through conductor 14 to terminal L2, the negative of the direct current source. A current limiting resistor 15 is interposed in the circuit to the grid provided by the conductor 14 and which also includes the secondary winding 16 of the transformer designated by numeral 18. The condenser 19 is connected across the grid 13 and cathode 12 of said electronic tube 10. The cathode 12 is connected to the resistance 20, and which resistance has its opposite end joined to conductor 21. Said conductor 21 is connected to L2 by means of the circuit including resistance 22 and the condenser 23. Due to the voltage drop across resistance 22 it will be seen that conductor 21 will have a positive potential with respect to terminal L2.

During operation of the system of Figure 1 the gas tube 10 is normally conductive so that current flow takes place through resistance 20 and through resistance 22. However, the gas tube 24, forming an element of the second commutating circuit, is maintained non-conductive since its grid is connected to terminal L2, whereas, the cathode is connected to conductor 21. Said tube 24 is similar to tube 10, having an anode 25, a cathode 26, and a grid 27. The anode is connected to positive terminal L1. The grid 27 is connected through conductor 28 to terminal L2, there being connected in series with the grid the current limiting resistor 29 and the secondary winding 30 of transformer 31. Cathode 26 is connected to resistance 32, which has its opposite end connected to conductor 21. The condenser 33 is connected across the grid 27 and cathode 26 of the electronic tube 24.

The timing means for the first commutating circuit consists of the gas filled grid controlled tube 34 having an anode 35, cathode 36, a screen grid 37, and a control grid 38. The anode 35 is connected through conductor 40 to the slider 41 of resistance 20, the connection including the switch 42 which must be closed in order to render the timing means operative. Conductor 40 is connected to conductor 21 by the conductor 43 which includes the condenser 44, the current limiting resistance 45 and the potentiometer 46. The screen grid 37 is connected to conductor 21 by the conductor 47. The cathode grid circuit of tube 34 includes the conductor 48, which provides the secondary winding 49 of transformer 50, having the primary winding 51. The circuits, including resistance 52 and condenser 53, are connected across secondary winding 49 whereby transformer 50 forms a peaking transformer by which the firing of tube 34 can be synchronized with the alternating current source connected to the terminals of the primary winding 51. The primary winding 54 of transformer 31 is connected between cathode 36 and the conductor 43, thus placing the condenser 44 in parallel circuit arrangement with tube 34.

The timing means for the second commutating circuit is similar to that above described, the same including a gas filled grid controlled tube 56 having an anode 57 connected to the slider 58 of the resistance 32. The screen grid 60 is connected by conductor 61 to conductor 21, whereas the control grid 62 is connected to the cathode 63 by the grid-cathode circuit including conductor 64 and the secondary winding 65 of the peaking transformer 66, having the primary winding 67. Conductor 68 connects slider 58 to conductor 21, the circuit including condenser 70, the current limiting resistance 21, and the adjustable potentiometer 72. The secondary winding 73 of transformer 18 is connected between cathode 63 and conductor 68.

As previously explained, tube 10 is conducting at the start of operations, whereas tube 24 is held in a non-conductive state as a result of the voltage drop across resistance 22, which places a negative bias potential on grid 27. When switch 42 is closed the condenser 44 will charge through resistor 46, the rate of charging depending on the setting of the adjustable resistor. After a predetermined time the condenser 44 will discharge through tube 34 causing a current pulse to flow through primary winding 54 of transformer 31. Tube 34 can be made to fire synchronously by the use of the peaking transformer 50 in the grid-cathode circuit. The pulse thus generated and caused to flow in primary winding 54 is transmitted to secondary winding 30 of said transformer 31, which secondary winding has location in the grid circuit of tube 24. The pulse initiates conductivity of tube 24 which upon firing initiates current flow through resistance 32. With tubes 10 and 34 both being conductive it will be seen that the negative end of condenser 55 is connected through conductor 59 and tube 24 to the anode 11 of tube 10. This renders the anode 10 negative with respect to the cathode 12 of said tube and the tube is extinguished with tube 24, however, remaining conductive. Condenser 70 is now charged through resistor 72 and after a period of time, determined by the setting of resistor 72, condenser 70 will discharge through tube 56. Here again the firing of tube 56 can be synchronized by using the peaking transformer 66. When tube 56 fires to discharge condenser 70 a pulse of current is caused to flow through primary winding 73 of transformer 18. This pulse is transmitted through secondary winding 16 to the grid of tube 10, initiating conductivity in tube 10 and current flow through resistor 20 and resistance 22. The voltage drop across resistance 22 immediately extinguishes tube 24.

Additional commutating circuits may be added similar to the two above described, in which case the current pulse through winding 73 would be used to initiate conductivity of the commutating tube in the next commutating circuit and the sequencing will thus continue for the number of circuits as may be used. The timing means associated with the last commutating circuit is applied to the grid of the first tube in a manner as described with respect to Figure 1 so that the system is preset and ready for another operation. It will also be understood that the voltages developed across the resistances 20 and 32, or across any one of the voltage dividers in any of the commutating tube circuits, may be used to operate other electronic circuits for performing desired functions of a machine.

Figure 2:
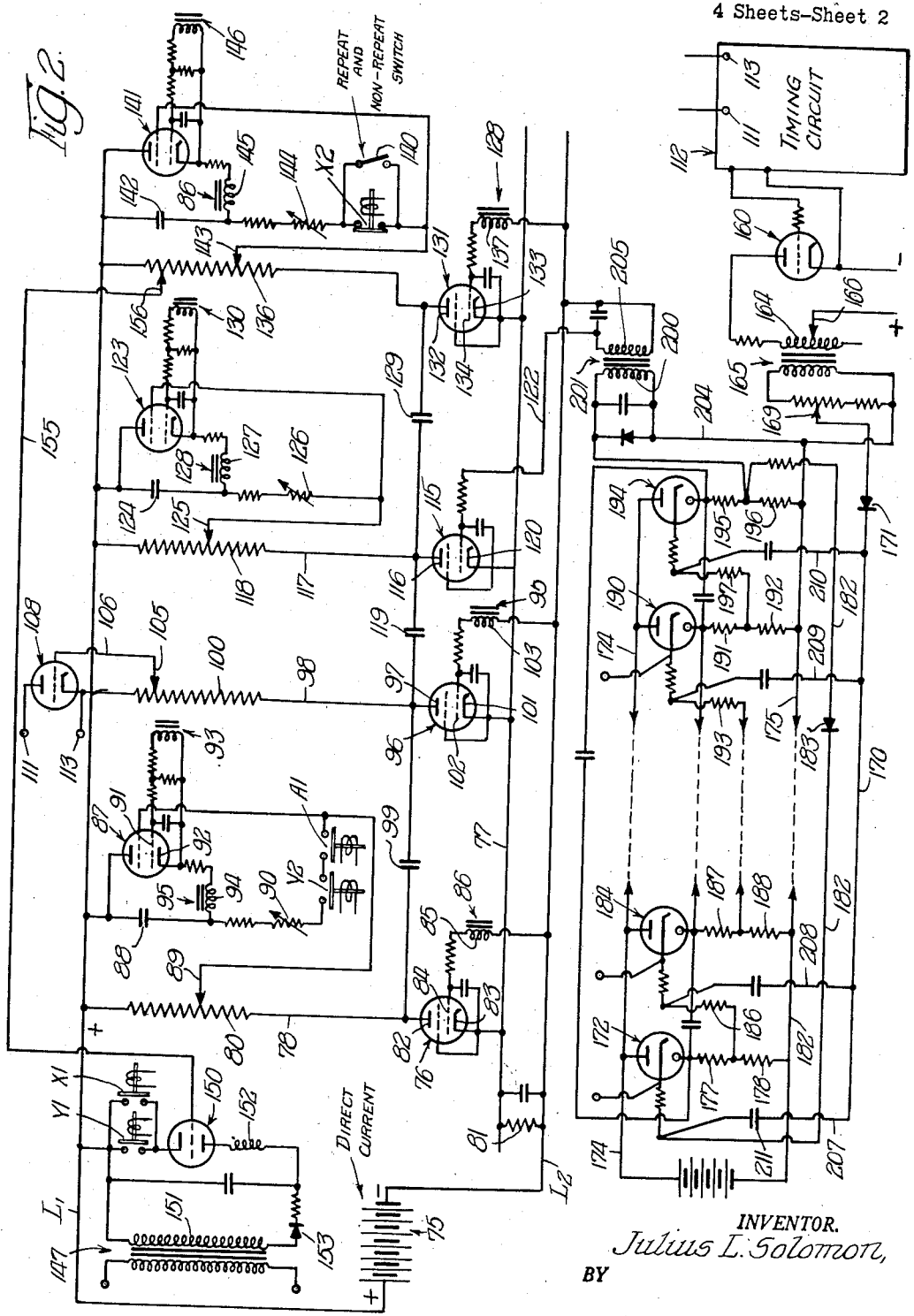
Figure 2 is a wiring diagram showing a complete sequencing circuit for a welder, the same incorporating the improved electronic counter of the invention for timing the weld period.

For example, in the system shown in Figure 2 the first commutating tube controls the squeeze period of a welder, the second commutating tube controls a circuit, which in turn times the weld "on" time period of the welder, and the third and fourth commutating tubes control the hold time and the "off" time respectively. The sysem of Figure 2 will now be described in detail.

Figure 3:
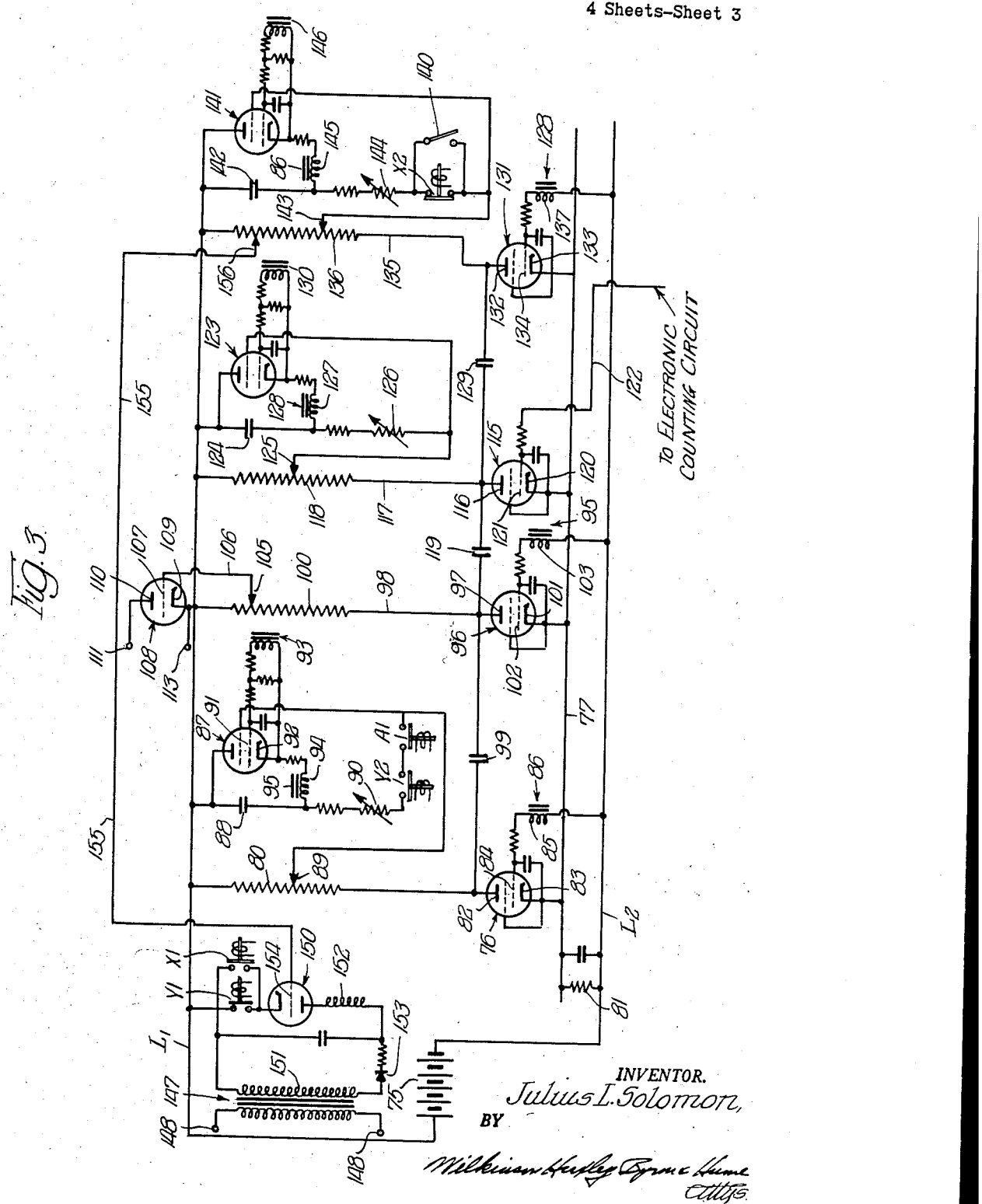
Figure 3 is a wiring diagram of the sequencing circuit of the complete system as shown in Figure 2.

Referring to Figures 2 and 3, the battery 75 supplies direct current to the terminals L1 and L2. The first commutating tube 76, which is gas filled and grid controlled, is connected across positive terminal L1 and conductor 77 by means of conductor 78 which includes resistance 80. When current flows through resistance 80, conductor 77 is maintained at a positive potential with respect to L2 by means of the voltage drop across resistance 81. The anode 82 of valve 86 is connected to conductor 78, whereas the cathode 83 is connected to conductor 77, and the control grid 84 is connected to negative terminal L2, the connection including the secondary winding 85 of transformer 86. The timing means for the first commutating tube includes tube 87 having condenser 88 connected in parallel therewith between the positive terminal L1 and slider 89 in contact with resistance 80. The potentiometer 90 is in series with condenser 88 and the circuit also includes the normally open contactors Y2 and A1. The control grid 91 and the cathode 92 are connected by a grid-cathode circuit which includes the peaking transformer 93 and the cathode circuit of the tube 87 is provided with the primary winding 94 of transformer 95.

The second commutating tube is indicated by numeral 96, the same having its anode 97 connected by conductor 98 to positive terminal L1, the connection including the resistance 100. The cathode 101 of said tube 96 is connected to conductor 77 and the control grid 102 is connected to terminal L2, the connection including secondary winding 103 of transformer 95. The slider 105 has contact with resistance 100 adjacent the positive terminal thereof and through conductor 106 the slider is joined to the grid 107 of tube 108. The cathode 109 of said tube is connected to positive terminal L1 and to resistance 100. Anode 110 is connected to terminal 111 of a timing panel identified by numeral 112 in Figure 2. The other terminal of the timing panel, namely, 113, is connected to the cathode of tube 108. When tube 108 is rendered conductive the circuit of the timing panel is closed so that the circuit is operative for timing the weld "on" time period of the welder.

The third commutating tube 115 has its anode 116 connected by conductor 117 to positive terminal L1, the circut including the resistance 118. The cathode 120 of tube 115 is connected to conductor 77 and the grid 121 is connected by conductor 122 to an electronic counting circuit which in Figure 2 has location below the sequencing circuit and which is best illustrated in its entirety in Figure 4. The details of the electronic counting circuit will be presently described. It is only necessary to note at this time that the circuit is capable of counting electric impulses within the range of the device which, for illustrative purposes, has a maximum of 10. The number of impulses to be counted can be preset by the setting of a switch and upon completion of the counting operation an impulse is delivered through conductor 122 for firing tube 115.

The timing means for the third commutating tube, includes the tube 123 which is connected in parallel with the condenser 124 included in the circuit between terminal L1 and the slider 125. The adjustable potentiometer 126 is in series relation with condenser 124 and the cathode of said tube 123 is connected to the potentiometer through primary winding 127 of transformer 128. The grid-cathode circuit of said tube includes the peaking transformer 130.

The fourth commutating tube is identified by numeral 131 having an anode 132, a cathode 133 and a control grid 134. The anode is connected through conductor 135 to positive terminal L1, the connection including resistance 136. The cathode 133 is connected to conductor 77 and the grid 134 is connected to terminal L2 through a circuit which includes secondary winding 137 of transformer 128. The firing of tube 131 initiates operation of the timing means for timing the "off" period, provided either the contactor X2 or the repeat and non-repeat switch 140 is closed. Said timing means includes tube 141 having the condenser 142 connected in parallel therewith between terminal L2 and the slider 143. The adjustable potentiometer 144 is in series with condenser 142 and in series with the normally closed contactor X2 which is in parallel with the switch 140. The cathode of tube 141 is connected to the potentiometer through primary winding 145 of transformer 86. The grid-cathode circuit of the tube includes the peaking transformer 146.

The transformer 147 is adapted to be connected to an alternating current source through terminals 148 and the secondary winding 151 of said transformer is connected to a vacuum tube 150. The anode of said tube has connection with the relay winding 152 and through the rectifier 153 the anode is connected to one terminal of the secondary winding 151. The other terminal of said secondary winding is connected to the cathode of tube 150 through a parallel circuit which includes contactors Y1 and X1. The grid 154 of said vacuum valve is connected by conductor 155 to slider 156, having contact with resistance 136 at the end adjacent the terminal L1.

To initiate the welding operation the operator steps on a foot switch having a first and a second closing position. The first closing position of the foot switch energizes a relay to close contactor X1 and to open contactor X2. Closing of contactor X1 fires tube 150 since it is connected across secondary winding 151. The current flow permitted by the tube energizes the relay winding 152 and said winding is thus operative to cause actuation of the electrodes of the welder so that they close upon the workpieces. The second position of the foot switch causes contactors Y1 and Y2 to close and with closing of Y1 the valve 150 is locked in closed circuit relation. Valve 76 is conductive at the start of these operations but valve 87 is held inoperative until both the contactors Y2 and A1 are closed. Y2 is closed with the second position of the foot switch and A1 will close shortly thereafter when the pressure on the work-pieces reaches a predetermined value, all as controlled by the energization of a relay winding (not shown), which in turn actuates contactor A1 to close. This starts the squeeze time and the duration of the period is determined by the setting of the potentiometer 90, since, as previously explained, the charging rate for condenser 88 is controlled by the potentiometer 90. When said condenser is fully charged, it fires tube 87 and discharges through the tube to produce a current pulse through primary winding 94 of transformer 95.

The current pulse flowing through primary winding 94 is communicated to secondary winding 103 of said transformer 95 and which winding is located in the grid circuit of tube 96. The pulse is effective to fire tube 96 and simultaneously therewith tube 108 is likewise rendered conductive. When both tubes 76 and 96 are conducting the action of condenser 99 is such as to place a negative potential on the anode 82 of tube 76 to thus extinguish the tube. It was previously explained that the timing panel was rendered operative by closing of the circuit through tube 108. Said panel is indicated in Figure 2 by the numeral 112 and for the details of a timing circuit as may be contained therein reference is made to the Solomon Patent No. 2,580,967, granted January 1, 1952, and entitled Electronic Timing Circuit. The action of the timing circuit, and the electronic counting circuit in associated relation therewith, is to time the weld "on" time period and at the end of the counting operation the current pulse delivered through conductor 122 to valve 115 is sufficient to fire the valve, causing the same to conduct. Here again the action of condenser 119 is to immediately extinguish tube 96. This terminates the welding operation and initiates operation of the timing means for the hold period. The charging rate of condenser 124 is determined by the setting of potentiometer 126 and when condenser 124 discharges through tube 123 a current pulse flows through winding 127 of transformer 128. The secondary winding of transformer 128 is located in the grid circuit of tube 131 and the action of the current pulse is to fire tube 131, which immediately extinguishes tube 115 because of the condenser 129. When tube 131 is rendered conductive current flows through resistance 136. The slider 143, having connection with said resistance, supplies a negative bias potential through conductor 155 to the grid of tube 150. This extinguishes tube 150 and the electrodes of the welder are caused to separate, releasing the welded workpieces. The above operations take place for a non-repeat setting of the "off" timing means and which requires that the operator maintain his foot on the foot pedal, thus holding contactor X2 disconnected. For a repeat operation the switch 140 can be closed, or, should the operator release the foot pedal and close contactor X2 the action is such as to initiate charging of condenser 142 immediately upon tube 131 being rendered conductive. Here again the charging rate of condenser 142 can be adjusted by the setting of potentiometer 144 and at the end of the "off" time period condenser 142 will discharge through valve 141, causing a current pulse to flow through winding 145 of transformer 86. The secondary winding of transformer 86 is located in the grid circuit of valve 76 and the current pulse is such as to fire valve 76 and the sequencing circuit is thus prepared for the next welding operation.

Figure 4:
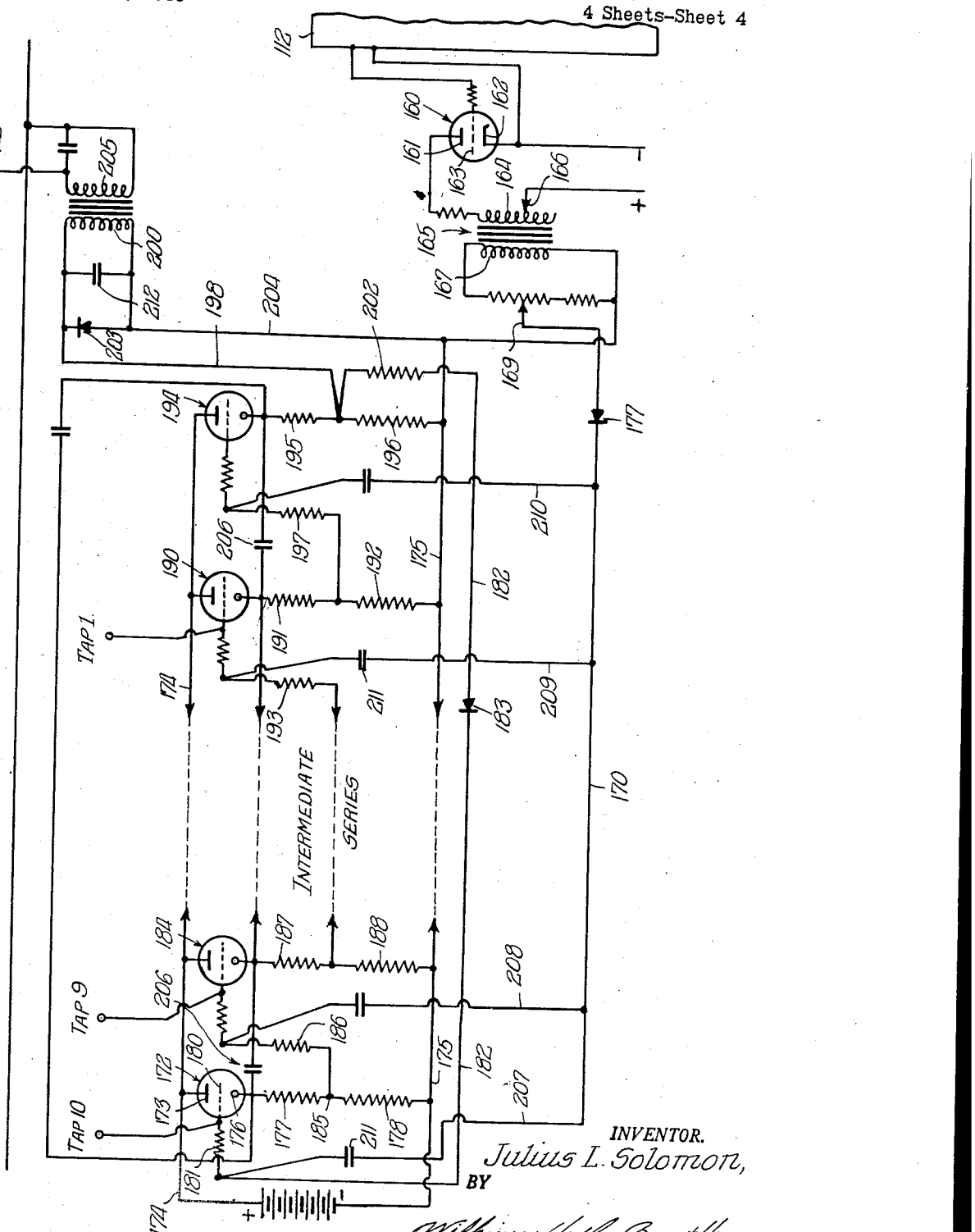
Figure 4 is a wiring diagram showing the electronic counter as illustrated in Figure 2.

Referring more particularly to the electronic counting circuit, as best shown in Figure 4, it will be understood that the timing circuit 112 operates to produce a square wave such as shown in Figure 5. The wave is supplied to vacuum tube 160 having an anode 161, a cathode 162 and a grid 163. The anode 161 is connected to the primary winding 164 of transformer 165. The opposite end of winding 164 is adjustably connected through slider 166 to the positive terminal of a source of direct current. The negative terminal of said direct current source is connected to cathode 162 of valve 160. The secondary winding 167 of transformer 165 is connected by a closed circuit to resistance 168. A slider 169, having contact with said resistance, is part of a circuit including conductor 170, there being interposed in the circuit the rectifier 171. The action of tube 160 and transformer 165 is to convert the square wave as generated by 112 into a plurality of peaked current impulses, such as shown in Figure 6, and which are supplied to rectifier 171. It may be assumed that the rectifier is adjusted to pass the positive current peaks only so that it will be understood that at periodic intervals a current pulse is supplied to conductor 170.

The counting mechanism essentially consists of a plurality of tubes for counting purposes and the number will vary, depending on the particular capacity for which the counting device may be designed. The system of Figure 4 is adapted to contain eleven tubes so that a ten count is the maximum for the system. Tube 172 is connected to tap 10, as shown, and said tube is of the cold cathode type, and gas filled with a triggering grid. The anode 173 is connected to conductor 174, having connection with the positive terminal of a source of direct current. The negative terminal of said source is connected to conductor 175 and the cathode 176 of tube 172 is connected to conductor 175 through resistances 177 and 178. The triggering grid 180 of the tube is connected through the current limiting resistor 181 to conductor 182, which conductor has interposed in series therewith the rectifier 183.

The next tube, indicated by numeral 184, is connected to tap 9. The structure and operation of this tube is the same as for tube 172. However, the grid of tube 184 is connected to the midpoint 185 between resistances 177 and 178, the said connection including resistance 186. The remaining tubes, connected to taps 8 to 2 inclusive, have not been shown since the circuit connections are identical. Referring to tube 190, it will be seen that said tube is connected to tap 1. The anode of said tube is connected to conductor 174, whereas the cathode is connected to conductor 175 through a pair of resistances 191 and 192. The grid of said tube 190 is connected through resistance 193 to the cathode connection of the preceding tube at a point midway between the resistances in the cathode circuit thereof, all as explained with respect to tube 184.

The last tube of the counting mechanism, identified by numeral 194, also has its anode connected to conductor 174 and its cathode connected through resistances 195 and 196 to conductor 175. The grid of tube 194 is connected through resistance 197 to the cathode circuit of tube 190 at a point between resistances 191 and 192, all in a manner as previously explained. A connection is likewise made between resistances 195 and 196, one conductor, namely, 198, having connection with primary winding 200 of transformer 201. The other connection includes conductor 182, which connects resistance 202 in series with the rectifier 183. The primary winding 200 has the rectifier 203 connected in parallel therewith and said rectifier is additionally connected through conductor 204 to the closed circuit including secondary winding 167 and resistance 168. The secondary winding 205 of transformer 201 is suitably connected to conductor 122, which conductor leads to the electronic sequencing circuit as has been described.

The number of impulses to be counted by the electronic counting circuit is dependent upon the setting of a switch having connection with the taps such as 1 to 10 inclusive, as illustrated in Figures 2 and 4. If, for example, the switch is set for 10, a positive voltage is applied to the grid 180 of tube 172 and the tube is accordingly rendered conductive. When tube 172 is conductive, a negative biasing voltage is applied to the grid of the next tube, namely, 184, which holds the tube in a non-conducting state. This is due to the fact that the voltage drop across resistance 178 in the cathode circuit of tube 172 is approximately forty volts, whereas, tube 184 requires a positive voltage of approximately seventy-three volts on its grid before the same is fired. The device remains in this condition with tube 172 conducting until the timing circuit is rendered operative. Said circuit produces a square wave voltage such as shown in Figure 5, which is transformed by tube 160 and transformer 165 into positive and negative pulses of peaked form as shown in Figure 6. These current pulses are rectified by 171, and, assuming that the positive pulses only are supplied to conductor 170, the action is such as to produce a voltage drop across resistance 186 of at least thirty-five volts, which, when added to the voltage drop across resistance 178 gives a total of plus seventy-five volts on the grid of tube 184. The tube 184 is thus rendered conductive and tube 172 is extinguished due to the action of condenser 206. It will be observed that a series of conductors 207, 208, 209 and 210 connect conductor 170 with the grid circuits of tubes 172, 184, 190 and 194, respectively. Each of the conductors 207, 208, etc. have a condenser such as 211 interposed therein and through these conductors the rectified pulses from 170 are supplied to the grid of the tubes. Each tube upon being fired by a current pulse results in extinguishing its subsequent tube and accordingly the complete circuit acts as a counter to count the impulses delivered through rectifier 171 to conductor 170 and thus to the grid of the tubes. It is possible to vary the "on" time and also the "off" time as regards the timing circuit 112 which will correspondingly modify the shape of the square wave delivered by the timing circuit. Thus, the duration between current impulses may be varied and when this is considered together with the fact that a setting of the switch can select any tap from 10 to 1, it is thus possible for the circuit to count a set number of pulses and wherein the duration between the pulses can also be varied.

The firing of the last tube 194 ends the counting operation and the conductivity of this tube delivers a pulse to winding 200 of transformer 201. A similar pulse is induced in the secondary winding 205 which is accordingly delivered to conductor 122. The dry rectifier 203 and condenser 212 act to nullify any stray current pulses and said circuit elements also prevent any such stray current pulses from passing through transformer 201 which might cause an improper signal to be delivered to the sequencing circuit. The circuit elements also act to prevent a current pulse from being delivered to resistance 202 in a reverse direction which might produce erratic operation of the counting tubes of the electronic counting device.

Upon completion of the counting sequence as determined by the firing of tube 194, it will be understood that said tube acts to open a contactor (not shown) which stops conduction of said tube and said action also acts to close another contactor (not shown) which pre-fires a predetermined tube, thus preparing the counting circuit for another operation. For example, if the tap switch is set at tap 9, the action would be to pre-fire tube 9, or if said switch was set at 7, the action would be to pre-fire tube 7 so that the parts will be in position to start another counting operation whenever the timing circuit, which produces the current impulses, is rendered operative. The current pulse induced in secondary winding 205 and thus delivered to conductor 122 functions to fire tube 115 whereby the welding time period is terminated and the hold time period is started. The decay of this energizing pulse as regards transformer 201 would produce a positive potential on the grid of tube 172, thus causing said tube to fire, were it not for the action of resistance 202 and rectifier 183, which functions to prevent this positive potential from reaching the tube 172.

The basic commutating circuit basically disclosed by the present drawings essentially consists of a start electric discharge valve in combination with a stop electric discharge valve, energy storage means, and an adjustable potentiometer whereby to vary the charging rate of said energy storage means. Each commutating circuit is connected across a source of direct current in parallel relation and the circuits have connection with each other in tandem whereby the discharging of the energy storage means of one commutating circuit is communicated inductively to the grid of the start valve of the next circuit to effect operation of that circuit in sequence. Although it is entirely practical to employ a series of commutating circuits as above described for controlling and timing the several steps in a welding operation, Figure 2 illustrates a preferred arrangement wherein an electronic counting circuit is employed for precise timing of the weld period. The said weld period is started by firing of a start tube and the current flow thus initiated is used to start operation of the counting circuit. Sequencing action from the electronic counting circuit to the next commutating circuit is produced by the last tube of the counting circuit which produces a pulse of current for firing the start tube of said next commutating circuit.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. A sequence timer for timing a series of events taking place in sequence, including a first and a second commutating circuit connected in parallel relation across a source of direct current, each commutating circuit including a start valve and a stop valve, said valves each having an anode, a cathode and a grid and being normally nonconductive, a capacitor connected to the anode and cathode circuits of each stop valve in parallel relation with the valve, a potentiometer in the cathode circuit of each stop valve and having a series circuit relation with the capacitor thereof, each potentiometer being adjustable for controlling the charging rate of the particular capacitor in series circuit relation therewith, the start valve of the first commutating circuit effecting current flow upon being rendered conductive to start charging of the capacitor thereof whereby to start timing of the first event, the stop valve of the first commutating circuit being rendered conductive when the capacitor thereof is charged to a predetermined extent and which thereby effects discharge of the capacitor to stop the timing of the first event, inductive means in the cathode circuit of the stop valve of the first commutating circuit and through which said capacitor discharges for rendering conductive the start valve of the second commutating circuit, whereby the timing of the second event is started, connections including a second capacitor electrically connecting the start valves for the first and second commutating circuits and operative to extinguish the start valve of the first commutating circuit when the start valve of the second commutating circuit is rendered conductive, said second commutating circuit operating in a manner similar to the first to thus time the second event, and a second inductive means in the cathode circuit of the stop valve of the second commutating circuit and through which the capacitor thereof will discharge when the stop valve is rendered conductive.

2. A sequence timer for timing a series of events as defined by claim 1, additionally including a peaking transformer in the grid-cathode circuits of the stop valves for both the first and second commutating circuits, whereby each stop valve is caused to fire synchronously with respect to an alternating current applied to its peaking transformer.

3. In an electronic timing circuit, in combination, a source of direct current including a positive and a negative conductor, a first start valve having an anode, a cathode and a grid, and being connected across said source with its anode connected to the positive conductor and the cathode connected to the negative conductor, a resistor in the circuit of said start valve, a stop valve also having an anode, a cathode and a grid and being connected across said resistor with the anode thereof having a more positive connection than the cathode, a capacitor connected to the anode and cathode of said stop valve in parallel relation with the valve, impedance means in the cathode circuit of said stop valve and having a series circuit relation with the capacitor, said impedance means thereby controlling the charging rate of said capacitor, the start valve effecting current flow through the resistor upon being rendered conductive to start charging of the capacitor whereby a timing operation of the circuit is initiated, said stop valve being rendered conductive when the capacitor is charged to a predetermined extent and which thereby effects discharge of the capacitor to stop the timing operation, inductive means in the cathode circuit of the stop valve and through which the capacitor discharges for rendering conductive a second start valve in a second timing circuit, and connections including a second capacitor electrically connecting the start valves and operative to extinguish the first start valve when the second is rendered conductive.

4. An electronic timing circuit as defined by claim 3, additionally including a peaking transformer in the grid-cathode circuit of the stop valve, and wherein the inductive means comprises the primary winding of a transformer which has its secondary winding in the grid circuit of the start valve of the second timing circuit.

5. A welding sequence timer for timing the functions of a welder, in combination with a source of direct current, a commutating circuit for timing one of said functions and an electronic counting circuit for timing another of said functions, said commutating circuit including a start valve and a stop valve each having an anode, a cathode and a grid, connections including a series resistor connecting the start valve across the direct current source with the anode having a positive connection and the cathode thereof having a negative connection, a capacitor, other connections for the stop valve and capacitor and which connect the same in parallel relation across the said resistor with the anode of the stop valve having a more positive connection than its cathode, whereby flow of current when the start valve is rendered conductive will charge the capacitor, impedance means in the cathode circuit of the stop valve for controlling the charging rate of the capacitor, inductive means also in the cathode circuit of the stop valve and in series relation with said impedance means, a start valve for the electronic counting circuit also connected across the direct current source, said stop valve being rendered conductive when the capacitor is charged to a predetermined extent and which discharges through the inductive means to render conductive the start valve of the electronic counting circuit, and connections including a second capacitor electrically connecting the start valves and operative to extinguish the start valve of the commutating circuit when the start valve of the electronic counting circuit is rendered conductive.

6. A welding sequence timer as defined by claim 5, wherein the inductive means comprises the primary winding of a transformer which has its secondary winding in the grid circuit of the start valve for the electronic counting circuit.

References Cited in the file of this patent

UNITED STATES PATENTS

| | | |
|---|---|---|
| 2,426,278 | Mumma | Aug. 26, 1947 |
| 2,447,661 | Mumma | Aug. 24, 1948 |
| 2,487,150 | Lexa | Nov. 8, 1949 |
| 2,573,360 | Rockafellow | Oct. 30, 1951 |
| 2,577,411 | Faulk | Dec. 4, 1951 |

OTHER REFERENCES

"Electronics Laboratory Manual," Westinghouse B-3351A, December 1945, pages 80–84.